United States Patent
Scoda

(10) Patent No.: US 9,876,776 B2
(45) Date of Patent: Jan. 23, 2018

(54) METHODS FOR GENERATING AND PUBLISHING A WEB SITE BASED ON SELECTED ITEMS AND DEVICES THEREOF

(71) Applicant: Usablenet Inc., New York, NY (US)

(72) Inventor: Enrico Scoda, Martignacco (IT)

(73) Assignee: UsableNet Inc., New York, NY (US)

( * ) Notice: Subject to any disclaimer, the term of this patent is extended or adjusted under 35 U.S.C. 154(b) by 18 days.

(21) Appl. No.: 14/676,465

(22) Filed: Apr. 1, 2015

(65) Prior Publication Data

US 2015/0312235 A1 Oct. 29, 2015

Related U.S. Application Data

(60) Provisional application No. 61/983,716, filed on Apr. 24, 2014.

(51) Int. Cl.
```
H04L 29/06     (2006.01)
H04L 29/08     (2006.01)
G06F 17/30     (2006.01)
G06F 17/24     (2006.01)
```

(52) U.S. Cl.
CPC .......... H04L 63/08 (2013.01); G06F 17/3089 (2013.01); G06F 17/30887 (2013.01); H04L 67/02 (2013.01); *G06F 17/24* (2013.01)

(58) Field of Classification Search
CPC ............... G06F 17/24; G06F 17/30887; G06F 17/3089; H04L 63/08; H04L 67/02
See application file for complete search history.

(56) References Cited

U.S. PATENT DOCUMENTS

| | | | | |
|---|---|---|---|---|
| 6,343,302 B1* | 1/2002 | Graham | ............. | G06F 17/3089 707/E17.116 |
| 9,031,988 B2* | 5/2015 | Tymoshenko | .... | G06F 17/30887 707/601 |
| 2002/0073125 A1* | 6/2002 | Bier | ........................ | G06F 17/24 715/255 |
| 2002/0087583 A1* | 7/2002 | Morgan | ................. | G06Q 30/06 |

(Continued)

OTHER PUBLICATIONS

Andreas Viklund, Tutorial: Building your first website using a free website template (part 2), Published Oct. 26, 2010, Retrieved from http://andreasviklund.com/learn/tutorial-building-your-first-website-using-a-free-website-template-part-2/.*

(Continued)

*Primary Examiner* — Chau Le
(74) *Attorney, Agent, or Firm* — LeClairRyan, a Professional Corporation

(57) ABSTRACT

A method, non-transitory computer readable medium, and web content management server computing device that receives, from a client device, requested data comprising at least a template identifier, information for a custom attribute, and a unique item identifier for an item. A public identifier and a uniform resource locator (URL) comprising at least the public identifier are generated. The public identifier is stored in a requested sites database as associated with the requested data. A preview panel comprising a selectable application indication is generated and sent to the client device. The URL is sent to the client device in response to receiving a selection of the selectable application indication from the client device.

18 Claims, 6 Drawing Sheets

(56) References Cited

U.S. PATENT DOCUMENTS

| | | | | |
|---|---|---|---|---|
| 2003/0023632 | A1* | 1/2003 | Ries | G06F 17/3089 715/235 |
| 2004/0148576 | A1* | 7/2004 | Matveyenko | G06F 17/2247 715/235 |
| 2004/0205572 | A1* | 10/2004 | Fields | G06F 17/3089 715/234 |
| 2005/0240657 | A1* | 10/2005 | Yamaguchi | G06F 17/3089 709/217 |
| 2006/0248442 | A1* | 11/2006 | Rosenstein | G06F 17/24 715/205 |
| 2008/0114867 | A1* | 5/2008 | Thayer | H04L 29/12594 709/223 |
| 2008/0172608 | A1* | 7/2008 | Patrawala | G06F 17/3089 715/255 |
| 2008/0306838 | A1* | 12/2008 | Fleet | G06Q 30/0603 705/26.81 |
| 2009/0043798 | A1* | 2/2009 | Tan | G06F 8/61 |
| 2012/0151321 | A1* | 6/2012 | Naismith | G06F 17/3089 715/234 |
| 2012/0216108 | A1* | 8/2012 | Yambal | G06Q 10/10 715/234 |
| 2013/0054757 | A1* | 2/2013 | Spitz | G06Q 30/0601 709/219 |
| 2013/0117657 | A1* | 5/2013 | Verlaan | G06F 17/212 715/234 |
| 2013/0174014 | A1* | 7/2013 | Kwan | G06F 17/30905 715/234 |
| 2013/0339845 | A1* | 12/2013 | Tomiyama | G06F 17/2247 715/235 |
| 2014/0075283 | A1* | 3/2014 | Coursol | G06F 17/3089 715/234 |
| 2014/0101249 | A1* | 4/2014 | Lampe | H04L 65/403 709/204 |
| 2015/0237085 | A1* | 8/2015 | Duncker | H04L 67/02 715/753 |

OTHER PUBLICATIONS

Lindsay Kolowich, "How to Create Social Sharing Links in Under 5 Minutes [Quick Tip]", Retrieved From https://blog.hubspot.com/marketing/social-sharing-links-quick-tip-ht, Published Jun. 6, 2014.*

"Share Button Generator", Retrieved From http://sharebuttongenerator.aakilfernandes.com/, Published Feb. 18, 2014.*

* cited by examiner

METHODS FOR GENERATING AND PUBLISHING A WEB SITE BASED ON SELECTED ITEMS AND DEVICES THEREOF

This application claims the benefit of U.S. Provisional Patent Application Ser. No. 61/983,716 filed on Apr. 24, 2014, which is hereby incorporated by reference in its entirety.

FIELD

This technology generally relates to web site generation and publishing, and more particularly to methods and devices for generating and publishing web sites based on wish lists of selected items.

BACKGROUND

Sharing of web content has become particularly prevalent with the increased use of mobile devices and social networks. Generally, content that is shared is not particularly rich and includes a small amount of text combined with an image or a link to a web site, for example. However, in order to share information for items on a social network, such as a number of products, a sending user generally has to provide to a recipient multiple links to each of the products, or a link to a web page which includes the desired products and a number of other products about which the sending user is not interested in sharing corresponding information.

Additionally, any customized or contextual information the sending user would like to associate with the product content is generally limited to the social network submission or other message, and not available along with the content after selection of a link included in the message by the recipient. Accordingly, sharing wish lists, or any other collection of selected items, is currently cumbersome and inefficient for users.

SUMMARY

A method for generating and publishing a web site based on selected items includes receiving, by a web content management server computing device and from a client device, requested data comprising at least a template identifier, information for a custom attribute, and a unique item identifier for an item. A public identifier and a uniform resource locator (URL) comprising at least the public identifier are generated, by the web content management server computing device. The public identifier is stored, by the web content management server computing device, in a requested sites database as associated with the requested data. A preview panel comprising a selectable application indication is generated and sent to the client device by the web content management server computing device. The URL is sent, by the web content management server computing device, to the client device in response to receiving a selection of the selectable application indication from the client device.

A non-transitory computer readable medium having stored thereon instructions for generating and publishing a web site based on selected items comprising executable code which when executed by a processor, causes the processor to perform steps including receiving, from a client device, requested data comprising at least a template identifier, information for a custom attribute, and a unique item identifier for an item. A public identifier and a uniform resource locator (URL) comprising at least the public identifier are generated. The public identifier is stored in a requested sites database as associated with the requested data. A preview panel comprising a selectable application indication is generated and sent to the client device. The URL is sent to the client device in response to receiving a selection of the selectable application indication from the client device.

A web content management server computing device including a processor and a memory coupled to the processor which is configured to be capable of executing programmed instructions comprising and stored in the memory to receive, from a client device, requested data comprising at least a template identifier, information for a custom attribute, and a unique item identifier for an item. A public identifier and a uniform resource locator (URL) comprising at least the public identifier are generated. The public identifier is stored in a requested sites database as associated with the requested data. A preview panel comprising a selectable application indication is generated and sent to the client device. The URL is sent to the client device in response to receiving a selection of the selectable application indication from the client device.

This technology provides a number of advantages including providing methods, non-transitory computer readable media, and devices that facilitate relatively efficient generation, publishing, and sharing of web sites that include content associated with selected items, such as those items selected for inclusion on a wish list by a user. With this technology, web sites can be generated to include content associated with selected items and custom attribute information and published based on a selected template. Web sites generated and published according to this technology can also be more easily shared by a user, such as on social networks, without requiring a user to provide multiple links or links to web pages with content corresponding to irrelevant items not selected by the user.

DETAILED DESCRIPTION

Figure 1:
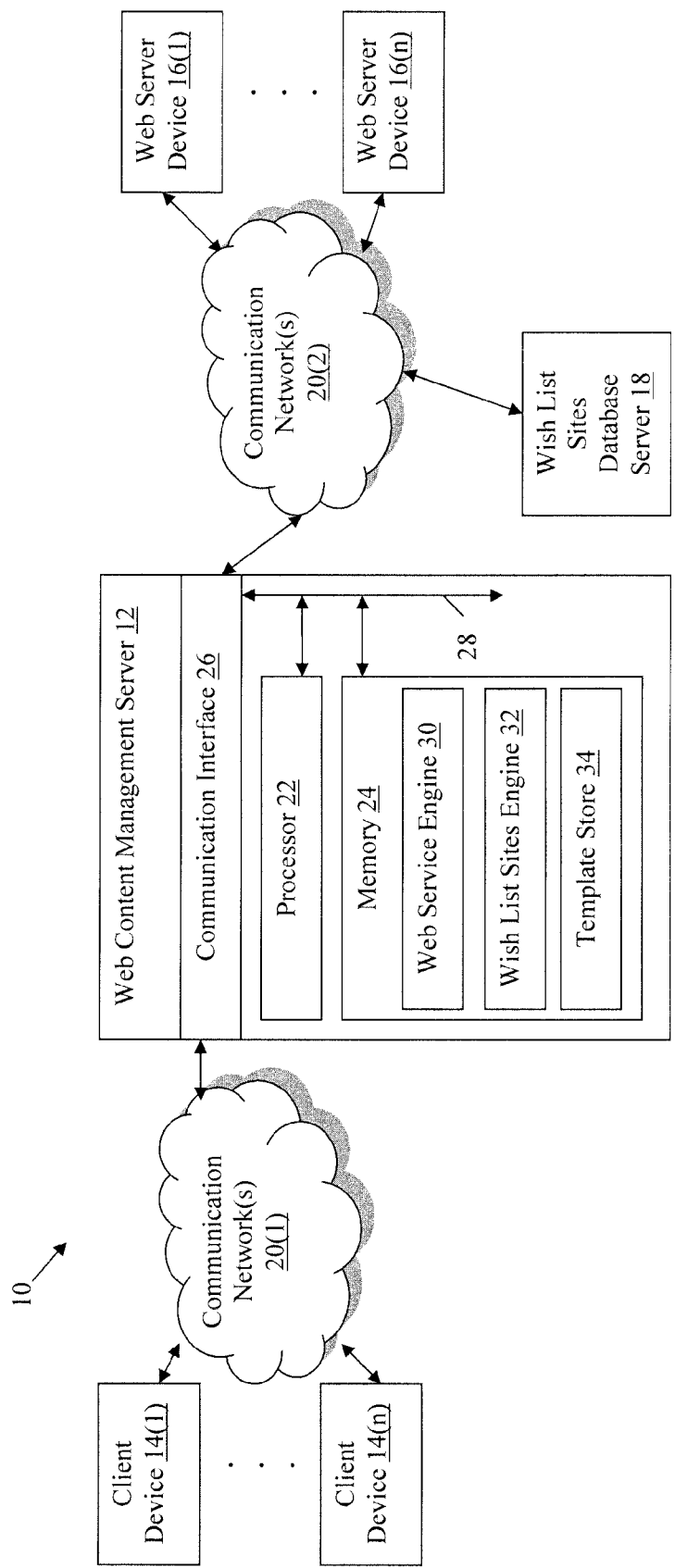
FIG. 1 is a block diagram of a network environment with an exemplary web content management server coupled to web server devices, client devices, and a wish list sites database server.

An exemplary network environment 10 with a web content management server 12 (also referred to herein as a web content management server computing device) coupled to client devices 14(1)-14(n), web server devices 16(1)-16(n), and a wish list sites database server 18 is illustrated in FIG. 1. In this example, the web content management server 12 is coupled to the client devices 14(1)-14(n) by communication network(s) 20(1) and to the web server devices 16(1)-16(n) and wish list sites database server 18 by communication network(s) 20(2), although other numbers and types of systems, devices, and/or elements in other configurations or network topologies can also be used. This technology provides a number of advantages including methods, non-transitory computer readable medium, and devices that improve sharing of content by facilitating the publishing of new web sites including content associated with selected items, such as those items selected by a user for inclusion on a wish list.

In this particular example, the web content management server 12 may perform any number of functions including facilitating the generating and publishing of new web sites for items selected by a user as well as other functions such as optimizing content retrieved from the web server devices 16(1)-16(n) for display on the client devices 14(1)-14(n), for example. In this example, the web content management server 12 includes a processor 22, a memory 24, and a communication interface 26, which are coupled together by a bus 28 or other communication link, although other numbers and types of components, parts, devices, systems, and elements in other configurations and locations can be used.

The processor 22 in the web content management server 12 executes a program of stored instructions one or more aspects of this technology, as described and illustrated by way of the embodiments herein, although the processor 22 could execute other numbers and types of programmed instructions. The processor 22 of the web content management server 12 may comprise one or more central processing units or general purpose processors with one or more processing cores, for example.

The memory 24 in the web content management server 12 stores these programmed instructions for one or more aspects of this technology, as described and illustrated herein, although some or all of the programmed instructions could be stored and/or executed elsewhere. A variety of different types of memory storage devices, such as a random access memory (RAM), read only memory (ROM), hard disk drive(s), solid state drives, flash memory, or other computer readable medium which is read from and/or written to by a magnetic, optical, or other reading and/or writing system that is coupled to the processor 22, can be used for the memory 24 in the web content management server 12.

In this example, the memory 24 includes a web service engine 30, a wish list sites engine 32, and a template store 34, although other engines, stores, and modules can also be included in the memory 24 in other examples. The web service engine 30 in this example can include programmed instructions that, when executed by the processor 22, facilitate creation of, and retrieval of information for, web sites at the request of users of the client devices 14(1)-14(n), for example, as described and illustrated in more detail later.

In this example, the wish list sites engine 32 can include programmed instructions that, when executed by the processor 22, facilitate construction of previously created web sites, for example, as described and illustrated in more detail later. The template store 34 includes a plurality of web site templates, each associated with a unique identifier that can be selected by users of the client devices 14(1)-14(n) for use in the generated web sites, for example. In other examples, the template store 34 can be maintained by one or more of the web server devices 16(1)-16(n) or located elsewhere in the environment 10.

The communication interface 26 in the web content management server 12 is used to operatively couple and communicate between the web content management server 12, client devices 14(1)-14(n), web server devices 16(1)-16(n), and the wish list sites database server 18, which are all coupled together via the communication network(s) 20(1) and 20(2). The communication network(s) 20(1) and 20(2) can include one or more local area network(s) (LANs) and/or wide area network(s) (WANs), although other types and numbers of communication networks or systems with other types and numbers of connections and configurations to other devices and elements can also be used.

By way of example only, the communication networks can use TCP/IP over Ethernet and industry-standard protocols, including hypertext transfer protocol (HTTP), secure HTTP (HTTPS), wireless application protocol (WAP), and/or SOAP, although other types and numbers of communication networks, such as a direct connection, modems and phone lines, e-mail, and wireless and hardwire communication technology, each having their own communications protocols, can be used. While not shown, the network environment 10 also may include additional network components, such as routers, switches and other devices, which are well known to those of ordinary skill in the art and thus will not be described here.

The client devices 14(1)-14(n) enable users to request, receive, and interact with applications, web services, and content hosted by the web server devices 16(1)-16(n) through the web content management server 12 and using the communication network(s) 20(1) and 20(2), although one or more of the client devices 14(1)-14(n) could access content and utilize other types and numbers of applications from other sources and could provide a wide variety of other functions for users. In some examples, the client devices 14(1)-14(n) comprise mobile devices that execute applications and have Internet access that enables web pages and other content stored by the web server devices 16(1)-16(n) to be retrieved and rendered. By way of example only, the client devices 14(1)-14(n) can be smart phones, laptops, tablets, or other computing devices.

In this particular example, each of the client devices 14(1)-14(n) includes a processor, a memory, an input device, a display device, and a communication interface, which are coupled together by a bus or other communication link, although one or more of client devices 14(1)-14(n) can include other numbers and types of components, parts, devices, systems, and elements in other configurations. The processor in each of the client devices 14(1)-14(n) can execute a program of instructions stored in the memory the client device 14(1)-14(n) for one or more aspects of this technology, as described and illustrated herein, although the processor could execute other numbers and types of programmed instructions.

The input device in each of the client devices 14(1)-14(n) can be used to input selections, such as a request for a particular web page or other content stored by one or more of the web server devices 16(1)-16(n), although the input device could be used to input other types of requests and data and interact with other elements. The input device can include keypads, touch screens, and/or vocal input processing systems for example, although other types and numbers of input devices can also be used.

The display device in each of the client devices 14(1)-14(n) can be used to show data and information to the user, such as web pages and other content retrieved from the web server devices 16(1)-16(n) by way of example only. The display device in each of the client devices 14(1)-14(n) can be a mobile phone screen display, although other types and numbers of displays could be used depending on the particular type of client device 14(1)-14(n). The communication interface in each of the client devices 14(1)-14(n) can be used to operatively couple and communicate between the client devices 14(1)-14(n), the web content management server 12, and the web server devices 16(1)-16(n) over the communication network(s) 20(1) and 20(2).

The web server devices 16(1)-16(n) provide content including web pages and web applications for use by one or more of the client devices 14(1)-14(n) via the web content management server 12, although the web server devices 16(1)-16(n) can provide other numbers and types of content and perform other functions. In this particular example, each of the web server devices 16(1)-16(n) includes a processor, a memory, and a communication interface, which are coupled together by a bus or other communication link, although each of the web server devices 16(1)-16(n) can have other numbers and types of components, parts, devices, systems, and elements in other configurations.

The processor in each of the web server devices 16(1)-16(n) executes a program of instructions stored in the memory of the web server devices 16(1)-16(n) for one or more aspects of this technology, as described and illustrated by way of the embodiments herein, although the processor could execute other numbers and types of programmed instructions. The communication interface in each of the web server devices 16(1)-16(n) is used to operatively couple and communicate between the web server devices 16(1)-16(n), the web content management server 12, and the client devices 14(1)-14(n) via the communication network(s) 20(1) and 20(2).

The wish list sites database server 18 in this example hosts one or more databases for storing requested data including template identifies, information for custom attributes, and unique item identifiers for each of one or more items as associated with public, and optionally private, identifiers, as described and illustrated in more detail later. In this particular example, the wish list sites database server 18 in this example includes a processor, a memory, and a communication interface, which are coupled together by a bus or other communication link, although the wish list sites database server 18 can have other numbers and types of components, parts, devices, systems, and elements in other configurations.

The processor in the wish list sites database server 18 executes a program of instructions stored in the memory of the wish list sites database server 18 for one or more aspects of this technology, as described and illustrated by way of the embodiments herein, although the processor could execute other numbers and types of programmed instructions. The instructions stored in the memory in this example can include a database management system (DBMS) such as MySQL, for example, although other DBMSs and applications can also be used. The communication interface in the wish list sites database server is used to operatively couple and communicate between the wish list sites database server 18 and the web content management server 12 via the communication network(s) 20(2).

Although embodiments web content management server 12, the client devices 14(1)-14(n), the web server devices 16(1)-16(n), and the wish list sites database server 18 are described and illustrated herein, the web content management server 12, the client devices 14(1)-14(n), the web server devices 16(1)-16(n), and wish list sites database server 18 are described herein are for exemplary purposes, as many variations of the specific hardware and software used to implement the embodiments are possible, as will be appreciated by those skilled in the relevant art(s). Furthermore, each of the devices of the embodiments may be conveniently implemented using one or more general purpose computers, microprocessors, digital signal processors, and micro-controllers, programmed according to the teachings of the embodiments, as described and illustrated herein, and as will be appreciated by those ordinary skill in the art.

In addition, two or more computing apparatuses or devices can be substituted for any one of the devices in any embodiment described herein. Accordingly, principles and advantages of distributed processing, such as redundancy and replication also can be implemented, as desired, to increase the robustness and performance of the devices of the embodiments. The embodiments may also be implemented on computer apparatuses or devices that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The embodiments may also be embodied as one or more non-transitory computer readable media having instructions stored thereon for one or more aspects of this technology as described and illustrated by way of the embodiments herein, as described herein, which when executed by a processor, cause the processor to carry out the steps necessary to implement the methods of the embodiments, as described and illustrated herein.

Figure 2:
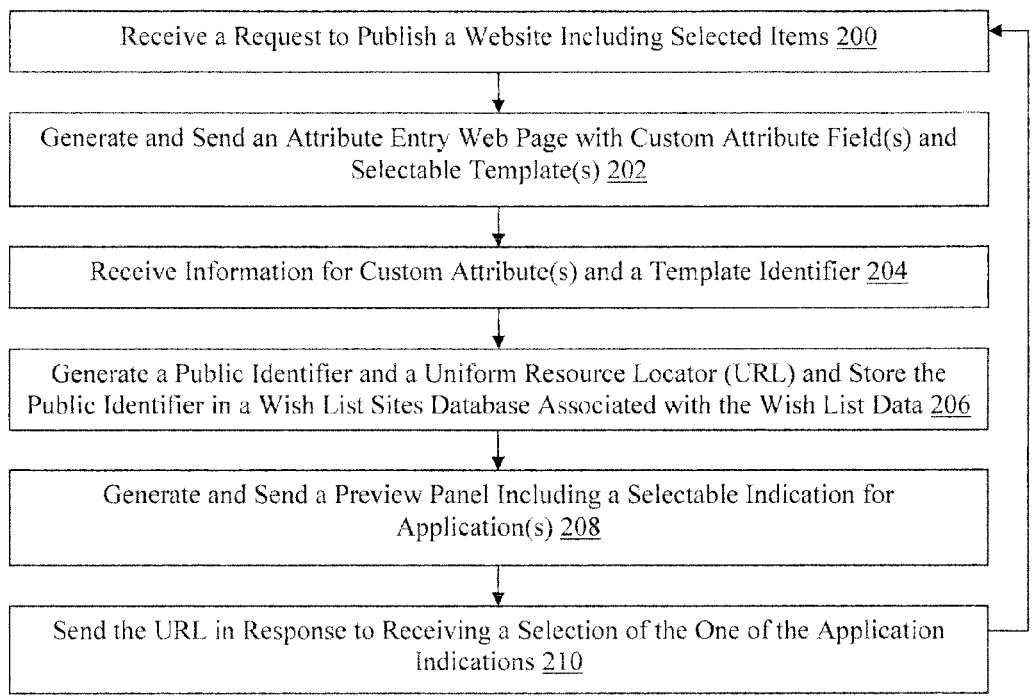
FIG. 2 is a flowchart of an exemplary method for processing requests to create a web site associated with a plurality of selected items.

An exemplary method for generating and publishing a web site based on selected items will now be described with reference to FIGS. 1-8. Referring more specifically to FIG. 2, a flow chart of an exemplary method for processing requests to create a web site associated with a plurality of selected items is illustrated. In step 200 in this particular example, the web content management server 12 receives a request to publish a web site including selected items from one of the client devices 14(1)-14(n). The request can be received by the web service engine 30 of the web content management server 12, for example, and can include an identifier for each of one or more selected items.

Figure 3:
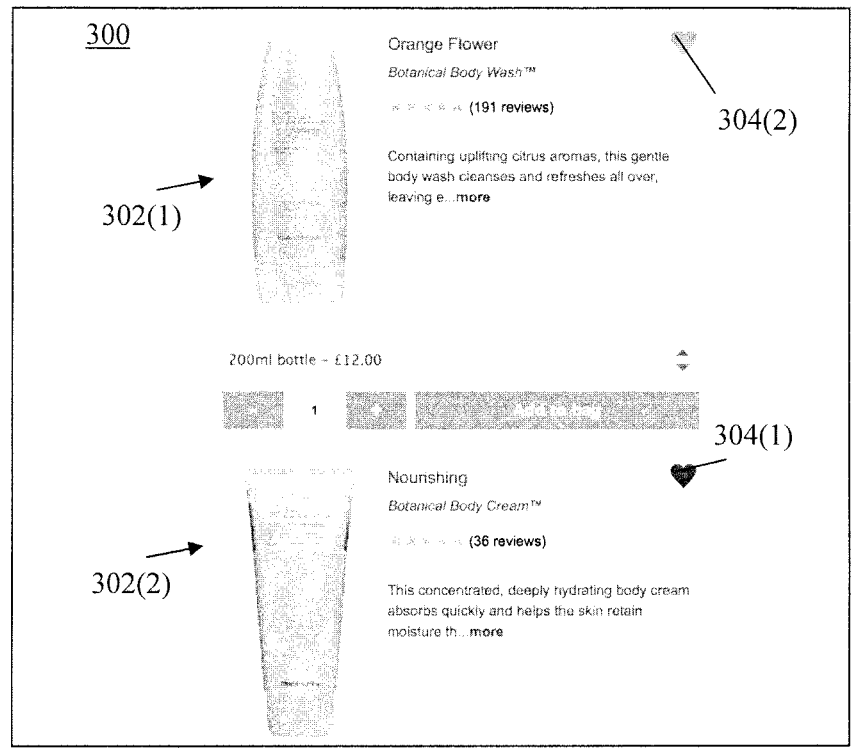
FIG. 3 is an exemplary mobile web page with a plurality of selectable items.

Referring more specifically to FIG. 3, an exemplary mobile web page 300 with selectable items 302(1) and 302(2) is illustrated. In this example, the items 302(1) and 302(2) are products for sale and each of the products is associated with a wish list icon 304(1) and 304(2) which can be selected by a user of one of the client devices 14(1)-14(n). Selection of one of the wish list icons 304(1) or 304(2) associated with an item 302(1) or 302(2) causes a host of the mobile web page 300, for example, to store an identifier of the item 302(1) or 302(2) on a wish list for the user. The wish list can be stored on one of the web server devices 16(1)-16(n), for example, and can be associated with an identifier for the user, such as a unique login to the web site associated with the mobile web page 300, for example. In this particular example, the wish list functionality allows a user of the web site associated with the mobile web page 300 to select a link for the wish list and view previously selected items.

Figure 4:
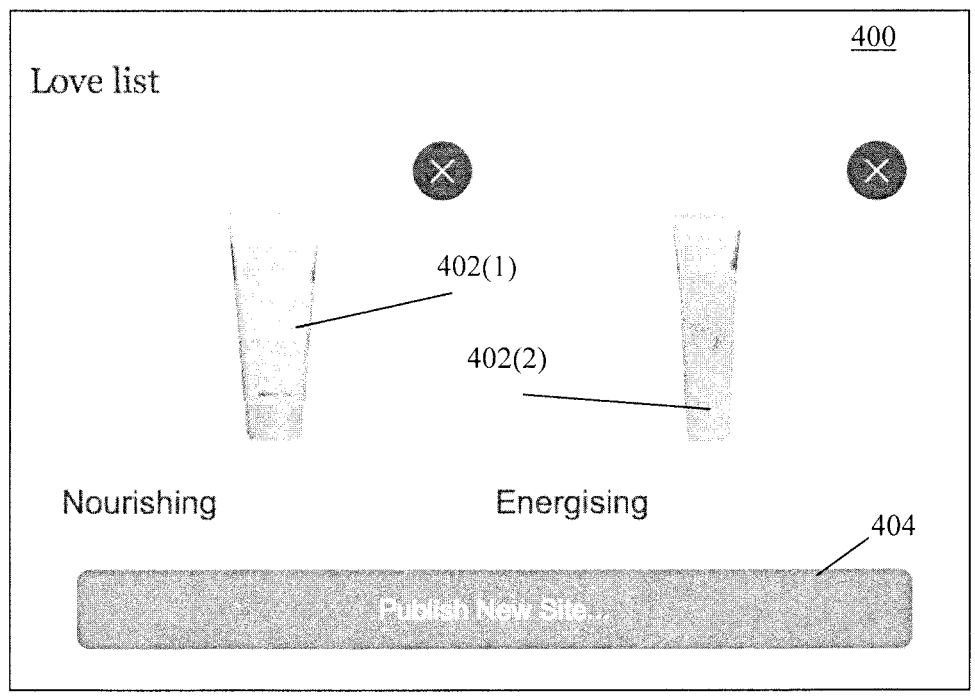
FIG. 4 is a an exemplary wish list web page including a wish list of a plurality of items.

Referring more specifically to FIG. 4, an exemplary wish list web page 400 including a wish list (also referred to herein as a love list) is illustrated. The wish list web page includes content associated with items 402(1) and 402(2) selected by a user, as described and illustrated earlier with reference to FIG. 3, for example. Additionally, the wish list web page 400 in this example includes a web site generator link 404, which in this example is a "Publish New Site . . . " button. When selected by a user of one of the client devices 14(1)-14(n), the web site generator link 404 initiates the request to publish a web site that is received by the web content management server in step 200 in FIG. 2

Accordingly, in this particular example the request received by the web content management server 12 in step 200 in FIG. 2 includes an indication of, or a unique item identifier for, each of one or more items 402(1) and 402(2) previously selected by a user of the one of the client devices 14(1)-14(n) for inclusion in a wish list. The unique item identifiers can include product identifiers and/or network locations (e.g., uniform resource locators (URLs)) associated with content (e.g., a description of the product, an image of the product, or a price of the product) corresponding to the selected items 402(1) and 402(2).

Referring back to FIG. 2, in step 202, the web content management server 12 generates and sends to the one of the client devices 14(1)-14(n) an attribute entry web page in response to the request to publish a web site received in step 200. The attribute entry web page in this particular example includes custom attribute field(s) and selectable template indication(s).

Figure 5:
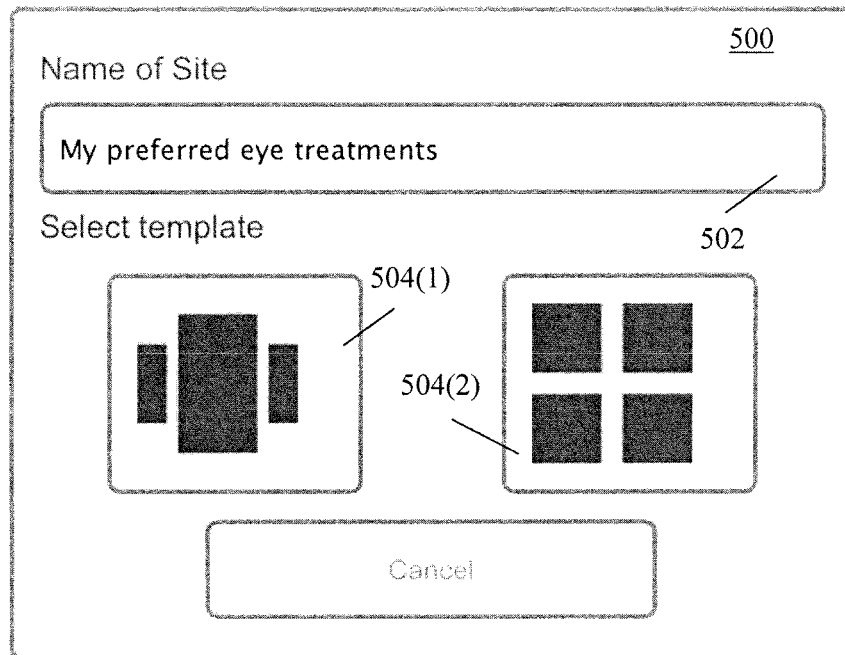
FIG. 5 is an exemplary attribute entry web page.

Referring more specifically to FIG. 5, an exemplary attribute entry web page 500 is illustrated. In this particular example, the attribute entry web page 500 includes one custom attribute field 502, which is configured to receive a name of the web site to be published, and two selectable template indications 504(1) and 504(2), although other numbers and/or types of custom attribute fields and selectable template indications can also be used. Each of the selectable template indications 504(1) and 504(2) can correspond with a template stored in the template store 34 of the memory 24 of the web content management server 12 and can be associated with a template identifier.

Referring back to FIG. 2, in step 204, the web content management server 12 receives information for the custom attribute(s) corresponding to the custom attribute field(s) and a template identifier from the one of the client devices 14(1)-14(n). Referring back to FIG. 5, in this example, the user of the one of the client devices 14(1)-14(n) can select one of the template indications 504(1) or 504(2) from the attribute entry web page 500 which causes the custom attribute information inserted into the custom attribute field 502 and an identifier associated with the selected one of the template indications 504(1) or 504(2) to be sent to the web content management server 12.

The information for the custom attribute(s) submitted via the custom attribute field 502, identifier associated with the selected one of the template indications 504(1) or 504(2), and the unique item identifier for each of one or more items, as received in step 200 of FIG. 2, are collectively referred to herein as the "wish list data." Although exemplary methods for receiving various portions of the wish list data by the web content management server 12 have been described and illustrated herein, other methods of receiving some or all of the wish list data can also be used.

Referring back to FIG. 2, in step 206, the web content management server 12 generates a public identifier, an optional private identifier, and a URL and stores the identifiers. The public or optional private identifier can be generated randomly or by any other method. The generated URL in this example includes the public identifier. In this example, the public and private identifiers are stored as associated with the wish list data in a database of the wish list sites database server 18, although in other examples the public and/or private identifier are stored in the memory 24 of the web content management server 12 or elsewhere in the network environment 10. The public identifier can be used by the web content management server 12 to generate the requested web site in response to a subsequent request for the web site using the URL, as described and illustrated in more detail later with reference to FIG. 7. The optional private identifier can be used to edit the generated web site, also as described and illustrated in more detail later.

In step 208, the web content management server 12 generates and sends to the one of the client devices 14(1)-14(n) a preview panel including selectable application indication(s). Optionally, the selectable application indications can be associated with a default set of applications that may be installed on the one of the client devices 14(1)-14(n), although any other method of determining the selectable application indications can also be used. The applications associated with the selectable application indications can include social media and/or messaging applications, for example, although the application indications can be associated with any other types and numbers of applications.

Figure 6:
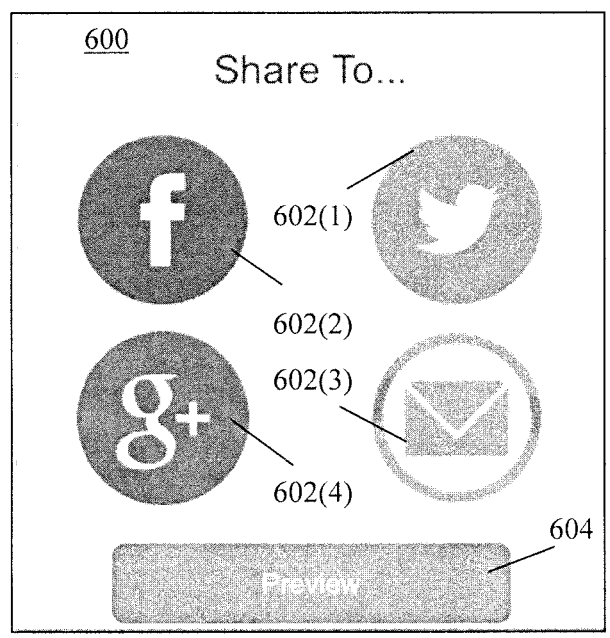
FIG. 6 is an exemplary preview panel.

Referring more specifically to FIG. 6, an exemplary preview panel 600 is illustrated. In this example, the preview panel 600 includes four selectable application indications 602(1)-602(4). Additionally, the preview panel 600 in this example includes a preview button 604 which allows a user of the one of the client devices 14(1)-14(n) to preview the requested web site, as described and illustrated in more detail later.

Referring back to FIG. 2, in step 210, the web content management server 12 sends the URL generated in step 206 to the one of the client devices 14(1)-14(n) in response to receiving a selection of one of the application indications 602(1)-6-2(4). Optionally, the web content management server 12 also sends the private identifier to the one of the client devices 14(1)-14(n). The private identifier can be sent in a cookie, for example, and is optionally encrypted, although other methods of sending the private identifier can also be used. In some examples, selection of one of the application indications 602(1)-602(4) can cause the one of the client devices 14(1)-14(n) to launch the associated application and generate a default message that includes the URL in the body.

For example, one of the application indications 602(1)-602(4) can be associated with a Short Message Service (SMS) messaging application. Accordingly, selection of the SMS messaging application one of the indications 602(1)-602(4) can cause the one of the client devices 14(1)-14(n) to launch the default SMS messaging application, as established by a user in the configuration of the one of the client devices 14(1)-14(n) for example, and generate an SMS message with the URL included in the body. The generated SMS message can then be edited by the user to include text content and recipients, for example, prior to being sent.

In another example, one of the application indications 602(1)-602(4) can be associated with the Facebook™ application. Accordingly, selection of the Facebook™ application one of the applications indications 602(1)-602(4) can cause the one of the client devices 14(1)-14(n) to launch the Facebook™ application and generate a status update, for example, that includes the URL. The status update can then be edited by the user prior to being submitted. Other exemplary applications and methods of generating messages to be shared that include the URL can also be used.

Figure 7:
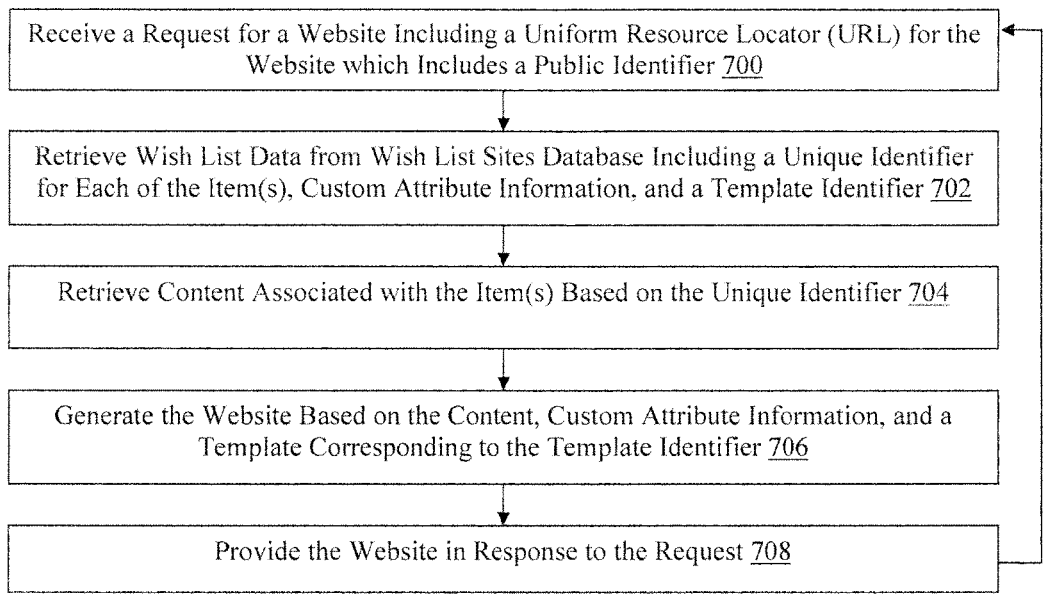
FIG. 7 is a flow chart of an exemplary method for processing requests for a previously created web site.

Referring more specifically to FIG. 7, a flow chart of an exemplary method for processing requests for a previously created web site is illustrated. In step 700 in this example, the web content management server 12 receives a request for a web site including a URL for the web site. In this example, the URL for the web site includes the public identifier. Accordingly, the web content management server 12 can parse web site requests and compare portions to of the requests to public identifiers that were previously stored, such as described and illustrated earlier with reference to step 206 of FIG. 2, for example, although other methods of determining whether a received URL includes a public identifier can also be used. Optionally, the request for the web site can be received by the wish list sites engine 32 of the web content management server 12, or forwarded to the wish list sites engine 32 upon identifying a public identifier in the URL.

In one example, the request for the web site can be received in response to a user of the one of the client devices 14(1)-14(n) selecting the preview button 604 of the preview panel 600 sent to the one of the client devices 14(1)-14(n) as described and illustrated earlier with reference to step 208 of FIG. 2, for example. In another example, the request for the web site is received from a different one of the client devices 14(1)-14(n). The different one of the client devices 14(1)-14(n) could have been a recipient of a social network submission or a message, for example, that included the URL and was made available to the different one of the client devices 14(1)-14(n) as described and illustrated earlier with reference to step 210 of FIG. 2. Other sources and methods of receiving the request in step 700 can also be used.

In step 702, the web content management server 12 retrieves wish list data, such as from the wish list sites database server 18 in this example. In one particular example, the wish list sites engine 32 communicates the public identifier extracted from the URL to the web service engine 30. The web service engine 30 then retrieves the wish list data from the wish list sites database 18, as previously stored such as described and illustrated with reference to step 206 in FIG. 2, for example, using the public identifier.

In step 704, the web content management server 12 retrieves content associated with the items corresponding to the unique identifiers for the items included in the wish list data retrieved in step 702. As described and illustrated earlier, the items can be identified based on unique product identifiers or URLs, for example, included in the wish list data. Accordingly, the web service engine, for example, can retrieve content (e.g., image(s), description(s), and/or price(s)) from one or more of the web server devices 16(1)-16(n) hosting the content, as identified based on the unique identifiers, such as by parsing retrieved web pages that include the content, for example. Other methods of retrieving the content associated with the item(s) corresponding to the unique identifiers of the wish list data can also be used.

In step 706, the web content management server 12 generates the requested web site based on the content retrieved in step 704, the custom attribute information retrieved along with the with list data in step 702, and a template. The template can be retrieved by the web service engine 30, for example, from the template store 34 using the template identifier included in the wish list data retrieved in step 702. Other methods of generating the web site can also be used. In step 708, the web content management server 12 provides the generated web site to a requesting one of the client devices 14(1)-14(n) in response to the request received in step 700.

Figure 8:
FIG. 8 is an exemplary wish list web site.

Referring more specifically to FIG. 8, an exemplary wish list web site 800, generated as described and illustrated with reference to step 706 of FIG. 7, for example, is illustrated. In this example, the wish list web site 800 includes custom attribute information 802 including the name of the web site, obtained such as described and illustrated in step 204 of FIG. 2 for example. The wish list web site 800 also includes content including an image 806, description 808, and pricing information 810 for the selected item 402(2). Additionally, the wish list web site 800 in this example includes an optional Add to Bag button 804, which is configured to integrate with the original web site hosting the content to facilitate purchasing of the product corresponding to the selected item 402(2). Other content and information can also be included on the wish list web site 800 in other examples.

Optionally, the web content management server 12 can be configured to provide an editing interface to the one of the client devices 14(1)-14(n) that requested the publishing of the web site in accordance with the method described and illustrated with reference to FIG. 2 for example. The editing interface can be provided to the one of the client devices 14(1)-14(n) in response to the user of the one of the client devices 14(1)-14(n) being authenticated based on the private identifier sent to the one of the client devices 14(1)-14(n) as described and illustrated earlier with reference to step 210 of FIG. 2, for example. The private identifier can be included as a cookie in a request for a web site received by the web content management server 12, for example. The editing interface can allow the user of the one of the client devices 14(1)-14(n) to change the template and/or add other custom attribute information, for example, although other types of edits can also be facilitated by the editing interface.

With this technology, web sites based on selected items, such as those associated with a wish list, can be generated and published in a relatively efficient manner based on a selected template and including custom attribute information provided by users. Additionally, the resulting web sites can also be more easily shared, such as on social networks for example, without requiring a user to provide multiple links or links to web pages with irrelevant items not selected by the user.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for generating and publishing a web site based on selected items implemented by one or more web content management server computing devices, the method comprising:

receiving, from a client device, requested data comprising at least a template identifier, information for a custom attribute, and a unique item identifier for an item;

generating a public identifier and a uniform resource locator (URL) comprising at least the public identifier and storing the public identifier as associated with the requested data;

generating and sending to the client device a preview panel comprising a plurality of selectable application indications associated with a plurality of applications; and sending the URL comprising the public identifier to the client device for inclusion in a message associated with one of the applications corresponding to one of the selectable application indications, in response to receiving a selection of the one of the selectable application indications from the client device.

2. The method of claim 1, further comprising:
receiving a request from the client device to publish a web site, the request comprising the unique item identifier for the item;
generating and sending to the client device an attribute entry web page comprising a field corresponding to the custom attribute and a selectable template indication; and
receiving and from the client device, the template identifier associated with the selectable template indications and the information for the custom attribute in response to submission of the attribute entry web page.

3. The method of claim 1, further comprising:
retrieving content associated with the item based on the unique item identifier for the item; and
generating and providing a web site comprising the content and based on the information for the custom attribute and a template obtained based on the template identifier.

4. The method of claim 3, further comprising:
receiving a request for a web site, the request comprising the URL, and performing the retrieving, the generating the web site, and the providing in response; and
extracting the public identifier from the URL and retrieving the requested data using the public identifier.

5. The method of claim 1, wherein the unique item identifier comprises a product identifier for the item or a network location associated with content corresponding to the item.

6. The method of claim 1, further comprising:
generating a private identifier, storing the private identifier in the requested sites database as associated with the requested data, and providing the private identifier to the client device;
receiving a request to edit a web site, the request including the private identifier; and
authorizing editing of the web site based on the private identifier.

7. A non-transitory computer readable medium having stored thereon instructions for generating and publishing a web site based on selected items comprising machine executable code which when executed by a processor, causes the processor to:
receive, from a client device, requested data comprising at least a template identifier, information for a custom attribute, and a unique item identifier for an item;
generate a public identifier and a uniform resource locator (URL) comprising at least the public identifier and store the public identifier as associated with the requested data;
generate and send to the client device a preview panel comprising a plurality of selectable application indications associated with a plurality of applications; and
send the URL comprising the public identifier to the client device for inclusion in a message associated with one of the applications corresponding to one of the selectable application indications, in response to receiving a selection of the one of the selectable application indications from the client device.

8. The non-transitory computer readable medium of claim 7, wherein the machine executable code when executed by the processor, further causes the processor to:
receive a request from the client device to publish a web site, the request comprising the unique item identifier for the item;
generate and send to the client device an attribute entry web page comprising a field corresponding to the custom attribute and a selectable template indication; and
receive, from the client device, the template identifier associated with the selectable template indications and the information for the custom attribute in response to submission of the attribute entry web page.

9. The non-transitory computer readable medium of claim 7, wherein the machine executable code when executed by the processor, further causes the processor to:
retrieve content associated with the item based on the unique item identifier for the item; and
generate and provide a web site comprising the content and based on the information for the custom attribute and a template obtained based on the template identifier.

10. The non-transitory computer readable medium of claim 9, wherein the machine executable code when executed by the processor, further causes the processor to:
receive a request for a web site, the request comprising the URL, and perform the retrieving, the generating the web site, and the providing in response; and
extract the public identifier from the URL and retrieving the requested data using the public identifier.

11. The non-transitory computer readable medium of claim 7, wherein the unique item identifier comprises a product identifier for the item or a network location associated with content corresponding to the item.

12. The non-transitory computer readable medium of claim 7, wherein the machine executable code when executed by the processor, further causes the processor to:
generate a private identifier, storing the private identifier in the requested sites database as associated with the requested data, and providing the private identifier to the client device;
receive a request to edit a web site, the request including the private identifier; and
authorize editing of the web site based on the private identifier.

13. A web content management server computing device, comprising a memory comprising programmed instructions stored thereon, the memory coupled to a processor which is configured to be capable of executing the stored programmed instructions to:
receive, from a client device, requested data comprising at least a template identifier, information for a custom attribute, and a unique item identifier for an item;
generate a public identifier and a uniform resource locator (URL) comprising at least the public identifier and storing the public identifier as associated with the requested data;
generate and send to the client device a preview panel comprising a plurality of selectable application indications associated with a plurality of applications; and
send the URL comprising the public identifier to the client device for inclusion in a message associated with one of the applications corresponding to one of the selectable application indications, in response to receiving a selection of the one of the selectable application indications from the client device.

14. The web content management server computing device of claim 13, wherein the processor is further configured to be capable of executing the stored programmed instruction to:
- receive a request from the client device to publish a web site, the request comprising the unique item identifier for the item;
- generate and sending to the client device an attribute entry web page comprising a field corresponding to the custom attribute and a selectable template indication; and
- receive, from the client device, the template identifier associated with the selectable template indications and the information for the custom attribute in response to submission of the attribute entry web page.

15. The web content management server computing device of claim 13, wherein the processor is further configured to be capable of executing the stored programmed instruction to:
- retrieve content associated with the item based on the unique item identifier for the item; and
- generate and provide a web site comprising the content and based on the information for the custom attribute and a template obtained based on the template identifier.

16. The web content management server computing device of claim 15, wherein the processor is further configured to be capable of executing the stored programmed instruction to:
- receive a request for a web site, the request comprising the URL, and performing the retrieving, the generating the web site, and the providing in response; and
- extract the public identifier from the URL and retrieving the requested data using the public identifier.

17. The web content management server computing device of claim 13, wherein the unique item identifier comprises a product identifier for the item or a network location associated with content corresponding to the item.

18. The web content management server computing device of claim 13, wherein the processor is further configured to be capable of executing the stored programmed instruction to:
- generate a private identifier, storing the private identifier in the requested sites database as associated with the requested data, and providing the private identifier to the client device;
- receive a request to edit a web site, the request including the private identifier; and
- authorize editing of the web site based on the private identifier.

* * * * *